United States Patent Office 3,735,001
Patented May 22, 1973

---

3,735,001
TECHNETIUM BONE SCANNING MEDIUM
James McRae, El Cerrito, Donald C. Van Dyke, Berkeley, and Yukio Yano, Richmond, Calif., assignors to the United States of America as represented by the United States Atomic Energy Commission
No Drawing. Filed May 24, 1972, Ser. No. 256,233
Int. Cl. A61k 27/04
U.S. Cl. 424—1
9 Claims

ABSTRACT OF THE DISCLOSURE

An aqueous solution of ethane-1-hydroxy-1,1-diphosphonate (EHDP) is added to an acidic solution of stannous chloride and mixed. $^{99m}TcO_4$ in isotonic saline solution is then added and the mixture is again mixed. The solution is adjusted to a pH of about 6–7 yielding a preparation appropriate for injection into a subject. The medium is highly specific with respect to deposition in the skeleton while troublesome and undesired effects such as colloid formation, binding to blood proteins, localization in the kidneys, etc., are avoided.

BACKGROUND OF THE INVENTION

The invention herein was made under, or in the course of Contract No. W–7405–ENG–48 with the United States Atomic Energy Commission.

Radio-scanning and similar radiographic techniques are finding ever-increasing application in biological and medical research and diagnostic procedures. Radio-scanning procedures involve the preparation of radioactive media which, upon injection, infusion or are otherwise introduced into a biological subject, become localized in specific organs, tissue or skeletal material which are under study. When so localized traces, plots or so-called "photographs" of the distribution of the radioactive material may be made by various radio-scanning means, i.e., such as by radiation detector arrays, traversing scanners, scintillation cameras and the like. See, for example, "Nuclear Physics in Medicine," Gordon L. Brownell and Robert J. Shalck. "Physics Today," August 1970, pp. 32–38. The resultant distribution and corresponding relative intensities may then be used to indicate the position occupied by the tissue in which the medium is localized as well as to indicate a presence of aberrations, pathological conditions and the like. The following references disclose radio-scanning devices as used in the art.

Anger, H. O.: While-body scanner Mark II. J. Nucl. Med. 7, 331 (1966).
Anger: H. O.: Tomographic gamma-ray scanner with simultaneous readout of several planes. In Fundamental Problems in Scanning, Gottschalk, A. and Beck, R. N., eds., Charles C. Thomas, Sprinfield, Ill., 1968.

The applicability of bone scanning techniques is limited largely by the availability of radio-scanning media of sufficient specificity and having an appropriate radiation emmission. Radio-scanning agents used for bone scanning heretofore leave much to be desired. A need therefor exists for improved bone (skeletal tissue) radio-scanning media. Technetium-99m possesses radio-emissive properties which would be suitable for such use provided that an injectable preparation having specific bone-localization properties were available.

SUMMARY OF THE INVENTION

The present invention relates, in general, to radio-scanning procedures and, more particularly, to preparation and use of a radio-scanning composition including ethane-1-hydroxy-1,1-diphosphonate combined with technetium ($^{99m}Tc$) through mediation by a stannous chloride reagent as well as to the composition itself.

Accordingly, it is an object of the invention to provide a superior agent for use in radiographic skeletal bone-scanning procedures.

Another object of the invention is to provide a composition including technetium labelled ethane-1-hydroxy-1,1-diphosphonate for use as a radiographic bone-scanning medium.

Still another object of the invention is to provide for the preparation of a composition including ethane-1-hydroxy-1,1-diphsophonate carrying $^{99m}$technetium in a form especially adapted to preferentially localize in skeletal bone tissue for injection into biological subjects and for subsequent scanning to display said bone tissue.

Other objects and features of the invention will be apparent in the following description:

For preparing the radio-scanning medium of the invention there is first prepared a fresh dilute solution of stannous chloride in dilute hydrochloric acid. For convenience relative proportions comprising about 10 mg. of reagent grade $SnCl_2 \cdot 2H_2O$ which may be dissolved in about 100 ml. of 0.01 N HCl with thorough mixing. A portion of such solution required for one or more doses may then be filtered through an ultra-filter medium (e.g., an 0.22µ Millipore filter) to remove bacteria and other extraneous materials, to be deposited for example, into an evacuated vial or a container containing inert gas so as to exclude oxygen.

A corresponding proportion of ethane-1-hydroxy-1,1-diphosphonate (EHDP), i.e., about 5 mg. of EHDP in about 1 ml. of sterile oxygen free water is dissolved with thorough mixing. The EHDP solution is then added to the stannous chloride solution with mixing.

Then the desired quantity of $^{99m}TcO_4$ activity is dissolved in normal saline solution with mixing. A relative proportion of about 3 ml. of saline solution may be used. Commercially available MEK (methyl ethyl ketone) extracted $^{99m}TcO_4$ having a concentration of 20 mCi/ml. in isotonic saline solution, or other suitable preparation, may be used to furnish the radio-technetium. For the relative volumes given herein, abotu 2.5 ml. to about 3.75 ml. of the foregoing commercial technetium activity may be used. An aliquot portion of the foregoing solution containing the appropriate dosage of $^{99m}TcO_4$ is then added to and mixed with the EHDP solution containing $SnCl_2 \cdot 2H_2O$. Thereafter, the pH of the solution is adjusted to a value in the range of about 6 to 7 with dilute alkali such as NaOH solution. The EHDP-$^{99m}Tc$ solution preparation may then be filtered through an ultra-filter such as an 0.22µ Millipore filter to insure sterility and remove possible pyrogenic substances.

The resulting EHDP-$^{99m}Tc$ preparation is "carrier free" and contains essentially about 1 mg. EHDP/ml., 0.02 mg. $SnCl_2 \cdot 2H_2O$/ml. and about 10–15 mCi $^{99m}Tc$/ml. The procedure insures that at least about 95% of the technetium activity is chemically bound to the EHDP, i.e., the chemical labelling efficiency is typically about 95% of the $^{99m}TcO_4$ added to the preparation. The binding efficiency and stability of the preparation were determined by ascending paper chromatography using Whatman No. 1 filter paper strips in 85% methanol solvent.

To insure longer shelf life the reagent solutions should be made oxygen free as by saturating the solutions with substantially oxygen free nitrogen gas and performing the operations in an oxygen free atmosphere or in a vacuum, e.g., a sealed evacuated serum vial. The reagents and glassware should be sterile and pyrogen free.

Preparations made by the foregoing procedure, may then be injected into suitable subjects, with the result that adequate amounts of the technetium activity are directed to localize principally in skeletal tissue (bone) to then permit radio-scanning using equipment and procedures known in the art. (Table I).

It is to be particulraly noted that variations in the method of preparation of the compound such as increased concentrations of Sn(II) and EHDP and altering the order of addition of the reagents results in preparations that localize primarily in the kidneys with retention of the activity in the kidneys even after 24 hours. The results of increased concentrations of EHDP (10 m./ml.), SnII (0.2 mg./ml.) and Sn(II), $^{99m}TcO_4$, EHDP order of addition of reagents is shown in Table 2. On the other hand, when the described method of preparation was followed, approximately 60–70% of the radioactivity was excreted by way of the kidneys. This excretion was nearly complete at 3 hours. There was little retention of activity within the kidneys which were thusly only faintly visualized by scintillation camera pictures.

TABLE I

[Percent uptake of EHDP-$^{99m}$Tc-Sn per whole organ of rat for varying molar ratios of EHDP:SnCl$_2$·2H$_2$O—Three hours after intravenous injection]

| | Molar ratio EHDP:SnCl$_2$·2H]O | | |
|---|---|---|---|
| | [1] 10:1, ml. | [1] 50z1, ml. | [3] 100z1, ml. |
| Organ: | | | |
| Blood | 0.023 | 0.054 | 0.022 |
| Heart | 0.009 | 0.020 | 0.012 |
| Lungs | 0.044 | 0.109 | 0.205 |
| Liver | 0.173 | 0.273 | 0.420 |
| Kidneys | 1.30 | 0.996 | 0.876 |
| Spleen | 0.012 | 0.016 | 0.036 |
| Gut | 1.40 | 0.798 | 0.842 |
| Muscle femur | | | 0.008 |
| Marrow plus femur | 1.08 | 1.88 | 1.10 |
| Marrow (by diff.) | 0.07 | 0.03 | |
| Femur | 1.01 | 1.85 | |
| Carcass | 35.7 | 39.9 | 34.4 |

[1] Mean of 2 rats, 0.5 mg. EHDP/kg. rat.
[2] Mean of 4 rats, 5 mg. EHDP/kg. rat.
[3] Mean of 2 rats, 5 mg. EHDP/kg. rat.

Table II, infra, shows the distribution of EHDP-$^{99m}$Tc in the whole organ of rats for variations in the order of addition of the chemical reagents; first by EHDP, Sn(II), $^{99m}TcO_4$ and second by Sn(II), $^{99m}TcO_4$, EHDP. The tissue distribution was determined at 3 and 20 hours after administration of EHDP-$^{99m}$Tc. By the first method the uptake in blood, liver, kidneys and gut is relatively low at 3 hours, while the bone uptake is high (comparable to $^{18}F$). However, when the second method is used the bone uptake decreases while the blood, liver and kidney uptake increases.

TABLE II

[Percent uptake of EHDP-$^{99m}$Tc-Sn per whole organ of rat for EHDP-Sn(II)-$^{99m}$Tc and for Sn(II-$^{99m}$Tc-EHDP—Preparations in order of reagent addition]

| | EHDP-Sn(II)-$^{99m}$Tc,[1] ml. | Sn(II)-$^{99m}$Tc-EHDP,[1] ml. | EHDP-Sn(II)-$^{99m}$Tc,[2] ml. | Sn(II)-$^{99m}$Tc-EHDP,[3] ml. |
|---|---|---|---|---|
| Organ: | | | | |
| Blood | 0.047 | 0.430 | 0.008 | 0.087 |
| Heart | 0.015 | 0.125 | 0.004 | 0.030 |
| Lungs | 0.104 | 0.409 | 0.019 | 0.137 |
| Liver | 0.273 | 11.41 | 0.223 | 10.3 |
| Kidneys | 1.04 | 2.77 | 0.910 | 2.70 |
| Spleen | 0.020 | 0.280 | 0.015 | 0.304 |
| Gut | 0.698 | 1.72 | 0.672 | 1.41 |
| Marrow plus femur | 2.11 | 1.22 | 1.63 | 1.13 |
| Marrow (by diff.) | | | 0.13 | 0.06 |
| Femur | | | 1.49 | 1.07 |
| Carcass | 33.5 | 33.3 | 30.4 | 26.8 |

[1] Mean of 2 rats, 5.0 mg. EHDP/kg. rat, 3 hours post-intravenous injection
[2] Mean of 2 rats, 5.0 mg. EHDP/kg. rat, 20 hours post-I.V. injection.
[3] One rat, 5.0 mg. EHDP/kg. rat, 20 hours post-I.V. injection.

Table III, infra, shows the results of diluting the standard EHDP-$^{99m}$Tc preparation 100-fold. The data indicates a breakdown of EHDP-$^{99m}$Tc in the diluted preparation with a decrease in bone uptake and an increase in soft tissue uptake.

TABLE III

[Percent uptake of EHDP-$^{99m}$Tc per whole organ of rat for standard 50:1, EHDP:SnII, for undiluted and 100 times dilution of preparation]

| | Undiluted [1] | 100× dilution [2] |
|---|---|---|
| Organ: | | |
| Blood | 0.062 | 0.201 |
| Heart | 0.025 | 0.069 |
| Lungs | 0.115 | 0.262 |
| Liver | 0.272 | 2.74 |
| Kidneys | 0.954 | 9.27 |
| Spleen | 0.013 | 0.055 |
| Gut | 0.897 | 26.88 |
| Marrow plus femur | 1.65 | 0.551 |
| Carcass | 46.4 | |

[1] 5 mg. EHDP/kg. rat.
[2] .05 mg. EHDP/kg. rat.
NOTE.—Time after injection, 3 hours.

The blood disappearance curves can be approximated with at least three components with $T_{1/2}$ 120 min., $T_{1/2}$ 17 min., and $T_{1/2}$ 12 min.

The method of using Sn(II) for labelling EHDP with $^{99m}$Tc is dependent upon the ability of chelating agents to stabilize Sn(II) and increase its usefulness as a reducing agent for $^{99m}TcO_4^-$. Furthermore, the stability of Sn-$^{99m}$Tc-EHDP preparation in vivo minimizes colloid formation at neutral pH and also minimizes the binding of Sn-$^{99m}$Tc to blood proteins.

The stability of the EHDP-$^{99m}$Tc in vitro is dependent upon removing air, i.e., oxygen, from the preparation. The initial chemical binding efficiency ranges from 90–96% and the amount of $^{99m}$Tc still bound to EHDP after 6 hours is 85–90% in an $O_2$-free system. When $O_2$ is not excluded, the preparation breaks down within 2–4 hours to about 65–75% $^{99m}$Tc bound to EHDP.

The estimated radiation dose delivered to a 70 kg. patient from 10 mCi of EHDP-$^{99m}$Tc is:

$D_{\beta,\gamma}$ (whole body) = 0.148 rad.
$D_{\beta,\gamma}$ (skeleton) = 3.68 rad.
$D_{\beta,\gamma}$ (kidneys) = 3.68 rad.
$D_{\beta,\gamma}$ (bladder) = 7.36 rad.
D = Dosage.

Materials and Methods

Commercially available MEK extracted $^{99m}TcO_4$ (20 mCi/ml. in isotonic saline is used for the preparation of Sn-$^{99m}$Tc-EHDP, hereafter referred to as EHDP-$^{99m}$Tc.

The method for making EHDP-$^{99m}$Tc is as follows:

(1) Dissolve 10 mg. of reagent grade $SnCl_2 \cdot 2H_2O$ in 100 ml. of 0.01 N HCl acid and filter 1 ml. of this solution through a 0.22μ Millipore filter into an evacuated serum vial. Reagent grade $SnCl_2 \cdot 2H_2O$ is used and freshly prepared in 0.01 N HCl acid just prior to the labelling procedure.

(2) Dissolve 5 mg. of EHDP in 1 ml. of sterile $O_2$-free $H_2O$ and add to the 1-ml. Sn(II) and mix for 1–2 minutes. The EHDP used as in this example is available through the Procter and Gamble Co. under the trade name "EHDP."

(3) Add the desired activity of $^{99m}TcO_4$ in 3 ml. of saline and mix for 1–2 minutes.

(4) Adjust the preparation of pH 6–7 with dilute NaOH solution.

(5) Finally filter the EHDP-$^{99m}$Tc through a 0.22μ Millipore filter to insure sterility of the preparation.

The EHDP-$^{99m}$Tc preparation is Tc "carrier free" and contains 1 mg. EHDP/ml. 0.02 mg. $SnCl_2 \cdot 2H_2O$/ml. and 10–15 mCi $^{99m}$Tc/ml. The chemical labelling efficiency is about 95% of the $^{99m}TcO_4$ added to the preparation.

The binding efficiency of the chemical labelling procedure and the stability of the preparation were determined by ascending paper chromatography using Whatman #1 paper strips in 85% methanol solvent.

To insure longer shelf life, of EHDP-$^{99m}$Tc, the reagent solutions should be made free of dissolved oxygen by saturating the solution with nitrogen and performing the chemical preparation in an evacuated and sealed serum vial. The reagents and glassware used for the preparation are sterile and pyrogen free.

Evaluation of EHDP-$^{99m}$Tc in animals

The EHDP-$^{99m}$Tc compound was evaluated by injection into Sprague-Dawley rats weighing 200–250 grams and in beagle dogs weighing about 20 pounds. In rats 0.5 ml. of the material was injected intravenously by tail vein, scintillation camera pictures were obtained to visualize the distribution of EHDP-$^{99m}$Tc at different times after intravenous injection. In rats both the multichannel and 1/8″ pinhole collimators were used. In dogs the whole body scanner and/or the tomographic scanner were also used.

Tissue distribution studies were done in rats by administering 0.5–1.0 ml. of EHDP-$^{99m}$Tc and sacrificing the animals at 3 hours and 20 hours.

Blood disappearance half-times were determined in dogs by taking 1-ml. blood samples from 1 minute to 180 minutes after administration of the EHDP-$^{99m}$Tc. The blood samples were counted in a well counter using an NaI (Tl) crystal and the data were plotted on semilog paper to obtain the blood disappearance half-times. A known dilution of the injected dose of $^{99m}$Tc was counted to determine the blood activity at zero time after injection.

Results and discussion

Table I, supra, shows the percent uptake of EHDP-$^{99m}$Tc for whole organs of rat (except skeleton which is represented by femur uptake and blood which is shown as uptake per ml.) for 10:1, 50:1, and 100:1 molar ratios of EHDP to SnCl$_2$·2H$_2$O three hours after intravenous injection. The uptake of $^{99m}$Tc in the carcass is primarily skeletal uptake and appears to be optimal at the 50:1 molar ratio of EHDP:SnCl$_2$·2H$_2$O. Molar ratios over the range of about 30:1 to about 70:1 may also be used. The percent uptake in the narrow was determined by difference from femur+marrow counts/min. less the counts/min. of femur alone.

While there has been described in the foregoing what may be considered to be preferred embodiments of the invention, modifications within the skill of the art may be made therein and it is intended to cover all such as fall within the scope of the appended claims.

What we claim is:

1. In a process for preparing a $^{99m}$Tc-ethane-1-hydroxy-1,1-diphosphonate radio-scanning medium, the steps comprising:
   mixing a dilute acidic aqueous solution of stannous chloride with a dilute aqueous solution of ethane-1-hydroxy-1,1-diphosphonate;
   adding a dilute saline solution containing $^{99m}$Tc activity to the solution derived in the foregoing step and into mixing same; and
   adjusting the pH of the intermixed solution to a pH in the range of about 6 to 7 to yield said radio-scanning medium.

2. A process as defined in claim 1 wherein said stannous chloride solution comprises a dilute solution of $$SnCl_2 \cdot 2H_2O$$

acidified with HCl and wherein the molar ratio of said ethane-1-hydroxy-1,1-diphosphonate to said SnCl$_2$·2H$_2$O is in the range of about 30:1 to about 70:1.

3. A process as defined in claim 1 wherein said $$SnCl_2 \cdot 2H_2O$$

solution comprises about 0.01 N HCl and is prepared and stored in an oxygen free environment.

4. A process as defined in claim 2 wherein the relative proportions of the components are such as to yield about 1 mg./ml. ethane-1-hydroxy-1,1-diphosphonate, 0.02 mg./ml. SnCl$_2$·2H$_2$O and about 10 to 15 mCi/ml. of $^{99m}$Tc/ml. in the final preparation.

5. A process as defined in claim 4 wherein said operations for preparing the preparation and storage of the preparation are conducted in a substantially oxygen free environment and the preparation is sterilized by ultra-filtration.

6. A process as defined in claim 4 wherein the additional steps of introducing said final preparation into a subject and radio-scanning the subject to determine the skeletal distribution of the $^{99m}$Tc activity are included.

7. A radio-scanning injectable aqueous solution composition comprising SnCl$_2$·2H$_2$O and ethane-1-hydroxy-1,1-diphosphonate in molar ratio proportions in the range of about 30:1 to about 70:1 and with an appropriate quantity of $^{99m}$Tc activity in association therein.

8. A radio-scanning composition as defined in claim 7 wherein said molar ratio proportion is about 50:1.

9. A radio-scanning composition as defined in claim 7 comprising essentially about 1 mg./ml. of ethane-1-hydroxy-1,1-diphosphonate, about 0.02 mg./ml. SnCl$_2$·2H$_2$O and about 10 to about 15 mCi $^{99m}$Tc activity, said solution having a pH value in the range of about 6 to 7.

References Cited

UNITED STATES PATENTS

| | | | |
|---|---|---|---|
| 3,436,354 | 4/1969 | Gemmill | 252—301.1 R |
| 3,466,361 | 9/1969 | Richards | 424—1 |
| 3,468,808 | 9/1969 | Arino | 252—301.1 R |
| 3,683,066 | 8/1972 | Ascanio et al. | 424—1 |

BENJAMIN R. PADGETT, Primary Examiner

U.S. Cl. X.R.

250—71.5 S; 252—301.1 R